US012760868B1

(12) United States Patent
Jiang et al.

(10) Patent No.: US 12,760,868 B1
(45) Date of Patent: Oct. 13, 2026

(54) LIGHT FIXTURE HAVING PROFILE SHAPING ELEMENT OF DYNAMICALLY CONTROLLABLE TEMPERATURE

(71) Applicant: Guangzhou Haoyang Electronic Co., Ltd., Guangzhou (CN)

(72) Inventors: Weikai Jiang, Guangzhou (CN); Mingjian Yuan, Guangzhou (CN); Xinhai Li, Guangzhou (CN); Chunyan Shen, Guangzhou (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 19/403,612

(22) Filed: Nov. 28, 2025

(30) Foreign Application Priority Data

Aug. 29, 2025 (CN) ........................ 202511234895.X

(51) Int. Cl.
*F21V 14/08* (2006.01)

(52) U.S. Cl.
CPC .................................... *F21V 14/08* (2013.01)

(58) Field of Classification Search
CPC ........................................................ F21V 14/08
See application file for complete search history.

(56) References Cited

U.S. PATENT DOCUMENTS 12,366,345 B1 * 7/2025 Liu ....................... F21S 10/007

* cited by examiner

*Primary Examiner* — Sean P Gramling
(74) *Attorney, Agent, or Firm* — Muncy, Geissler, Olds & Lowe, P.C.

(57) ABSTRACT

A light fixture includes a profile shaping element for shaping a source light beam, which is provided with a light transmission portion for the effective light rays to pass through and a profile shaping driver for changing an area and/or a shape of the light transmission portion; and a light shading element arranged including at least three light shading blades and at least one blade driver independently driven relative to the profile shaping driver. The blade driver is configured to drive the light shading blades to block at least portion of the ineffective light rays in a way that the adjacent light shading blades are partially stacked on top of one another and keep the at least three light shading blades beyond the effective light rays, in response to the area and/or the shape of the light transmission portion being changed by the profile shaping driver.

15 Claims, 5 Drawing Sheets

A

B

LIGHT FIXTURE HAVING PROFILE SHAPING ELEMENT OF DYNAMICALLY CONTROLLABLE TEMPERATURE

CROSS REFERENCE TO RELATED APPLICATIONS

The present application claims priority from Chinese Application No. CN 202511234895.X filed on Aug. 29, 2025, all of which are hereby incorporated herein by reference.

TECHNICAL FIELD

The present disclosure relates to the technical field of light fixtures, and more specifically, to a light fixture having a profile shaping element of dynamically controllable temperature.

BACKGROUND

Light fixtures used to create stage atmosphere for performance are usually internally equipped with a profile shaping element to shape the light beam so as to project light spots with various light effects. To achieve profile shaping, the profile shaping element is generally made very thin, and to further avoid reflecting stray light, the profile shaping element is typically made black or dark gray. In addition, as a long-distance illuminating device, the light fixture usually has a light source with high power generally 500 W or more, even up to 800 W, and having a tendency to pursuing higher power. Accordingly, ultra-thin and deep-colored profile shaping element would absorb a large amount of heat during shaping of light beams, resulting in being prone to deformation, cracking, or even melting. To reduce possibility of such thermal damage, the profile shaping element is generally made of high-temperature-resistant materials and cooled by heat dissipation fans during use. Such method, however, cannot completely avoid thermal damage, while causing increased cost.

SUMMARY

The present disclosure therefore provides an improved light fixture, in which the profile shaping element can effectively avoid thermal damage with at least portion of ineffective light rays blocked by the light shading blades.

The light fixture of the present disclosure may include a light source for emitting a source light beam containing effective light rays and ineffective light rays; a profile shaping element for shaping the source light beam, which is formed with a light transmission portion for the effective light rays in the source light beam to pass through and provided with a profile shaping driver for changing an area and/or a shape of the light transmission portion; and a light shading element arranged between the profile shaping element and the light source, which includes at least three light shading blades arranged circumferentially around the effective light rays, and at least one blade driver independently driven relative to the profile shaping driver, where the at least one blade driver may be configured to drive the at least three light shading blades to block at least portion of the ineffective light rays in a way that the at adjacent light shading blades are partially stacked on top of one another and keep the at least three light shading blades beyond the effective light rays, in response to the area and/or the shape of the light transmission portion being changed by the profile shaping driver.

According to the light fixture of the present invention, with the ineffective light rays partially blocked by the light shading blades, a region of the profile shaping element beyond the light transmission portion can be at least partially blocked, so that the ineffective light rays irradiating the profile shaping element can be reduced, resulting in reduced heat accumulation on the profile shaping element, thereby enabling temperature of the profile shaping element to be always maintained below the tolerance limit of the profile shaping element. In addition, with the at least three light shading blades arranged circumferentially around the effective light rays passing through the light transmission portion of the profile shaping element, and the blade driver independently driven relative to the profile shaping element, the adjacent light shading blades can be driven to partially stacked so as to cooperatively block the ineffective light rays, according to the change in area and/or shape of the light transmission portion of the profile shaping element. In such configuration, the cooperation among the light shading blades allows for greater flexibility in adapting to the change of the light transmission portion. Therefore, in a case that the light transmission portion has great changes in area and/or shape, heat accumulation on the profile shaping element can still be accurately controlled, additionally the light shading blades are also more compact in structure.

The change in area and/or shape of the light transmission portion may cause decrease or increase of the number of the effective light rays. In a case that the change in the area and/or the shape of the light transmission portion results in decrease of the number of the effective light rays, namely the portion of the effective light rays of the light beam is narrowed, the blade driver may be activated subsequent to the light transmission portion being changed for a first predetermined time. Such configuration keeps the light shading blades stationary for a predetermined period, when the area and/or shape of the light transmission portion frequently narrows and restores to its original state, which can avoid impact on light effects due to the fact that the light shading blades do no retract timely and cause the light shading blades accidentally entering into the effective light rays, as the light shading blades usually move slowly during restoration of the light transmission portion.

While in a case that the change in the area and/or the shape of the light transmission portion results in increase of the number of the effective light rays, namely the portion of the effective light rays of the light beam is widened, the blade driver is activated prior to the change of the light transmission portion. In such configuration, when the profile shaping driver receives an instruction to change the light transmission portion to increase the number of the effective light rays, namely widen the portion of the effective light rays of the light beam, the light shading blades are retracted in advance to provide space for part of the ineffective light rays to become the effective light rays.

In the present disclosure, when the ineffective light rays are at least partially blocked by the light shading blades, a closed region may be formed within the source light beam by the light shading blades surrounding the effective light rays, and the profile shaping element is exposed to the source light beam only in the closed region, namely the source light beam can only be directed to the profile shaping element through the closed region. Such configuration allows the periphery of the light transmission portion to be blocked by the light shading blades, which reduces the width of a part of the profile shaping element continuously irradiated by the ineffective light rays in a direction perpendicular to the emitting direction of the source light beam, thereby preventing excessive heat accumulation. Conceivably, the ineffective light rays may be completely blocked by the light shading blades.

In an advantageous embodiment of the present disclosure, in order to reduce requirements on control accuracy and the edge design of the light shading blades, the ineffective light rays may be configured to be completely blocked by the profile shaping element and the light shading blades. The profile shaping element in this case also serves to assist in heat dissipation, and the light shading blades allow for unique shapes design.

To further reduce the width of the part of the profile shaping element continuously irradiated by the ineffective light rays and thus further prevent excessive heat accumulation, a diameter of a maximum inscribed circle in a projection region of the ineffective light rays on the profile shaping element may be less than or equal to 7 mm.

Preferably, the reflectivity of one side of each light shading blade close to the light source may be greater than 70%, more preferably 80%, in particular 90%. Therefore, over 70% of the ineffective light rays irradiated onto the light shading blades can be reflected to prevent heat accumulation thereon, thereby enabling long-term interception of the ineffective light rays.

Alternatively or additionally, as a diffuse reflection structure can reduce stray light directed toward the light transmission portion, the surface of one side of each the light shading blade close to the profile shaping element may be formed in the diffuse reflection structure. This ensures pure effective light rays passing through the light transmission portion, resulting in fewer mixed colors in the formed light spots.

In a preferable embodiment, the light fixture may further include a focusing lens movable along the emitting direction of the source light beam, where the profile shaping element and the light shading blades are both located within a depth of focus of the light beam relative to the focusing lens. The light shading blades can also be capable of shaping the light beam to form light spots with the profile shape of the light shading blades, by moving the focusing lens, it is possible to project light spots shaped by the profile shaping element or the light shading blades, thereby achieving various light effects.

Furthermore, to ensure clear edge of the projected light spot, especially in a case that the light shading blade is used for imaging, a thickness of each of the light shading blade may be preferably less than 0.5 mm.

In a particular embodiment, the profile shaping element may include a plurality of shutter blades, and a first mounting plate and a second mounting plate disposed opposite to each other. In such case, the first mounting plate and the second mounting plate may be correspondingly provided with light-transmitting holes, the shutter blades may be arranged around the light-transmitting holes, and each of the shutter blades may have one end pivotally connected to the first mounting plate and the other end slidably connected to the second mounting plate. The light transmission portion in this case may be jointly formed by the shutter blades, and the area and/or the shape of the light transmission portion may be changed by the profile shaping driver driving the first mounting plate or the second mounting plate to rotate. This control method allows all the shutter blades to share one profile shaping driver, which can achieve timely response due to fast driving speed and high driving efficiency.

Preferably, a plurality of blade drivers independently driven may be provided for the light shading blades. Especially, each light shading blade may be driven by two independently driven blade drivers to perform linear movement and/or rotation. Such configuration enables more precise, flexible, and reliable control of the light shading blades, facilitating blocking of the ineffective light rays.

More particularly, two pairs of light shading blades may be provided, which are respectively arranged along a transverse direction and a longitudinal direction perpendicular to the emitting direction of the source light beam. The four light shading blades block the ineffective light rays in four different directions, which enables precise adaptation to the change in the area and/or the shape of the light transmission portion, thereby achieving improved temperature control of the profile shaping element.

In a preferable embodiment, in order to further effectively avoid local heat accumulation of the profile shaping element and thus achieve long-term interception of the ineffective light rays, the light shading blades are driven by the blade driver to change portions thereof that block the ineffective light rays, in a case that temperature of any one of the light shading blade exceeds a predetermined temperature or any one of the light shading blades remain stationary relative to the ineffective light rays for more than a second predetermined time.

DETAILED DESCRIPTION OF THE EMBODIMENTS

Figure 1:
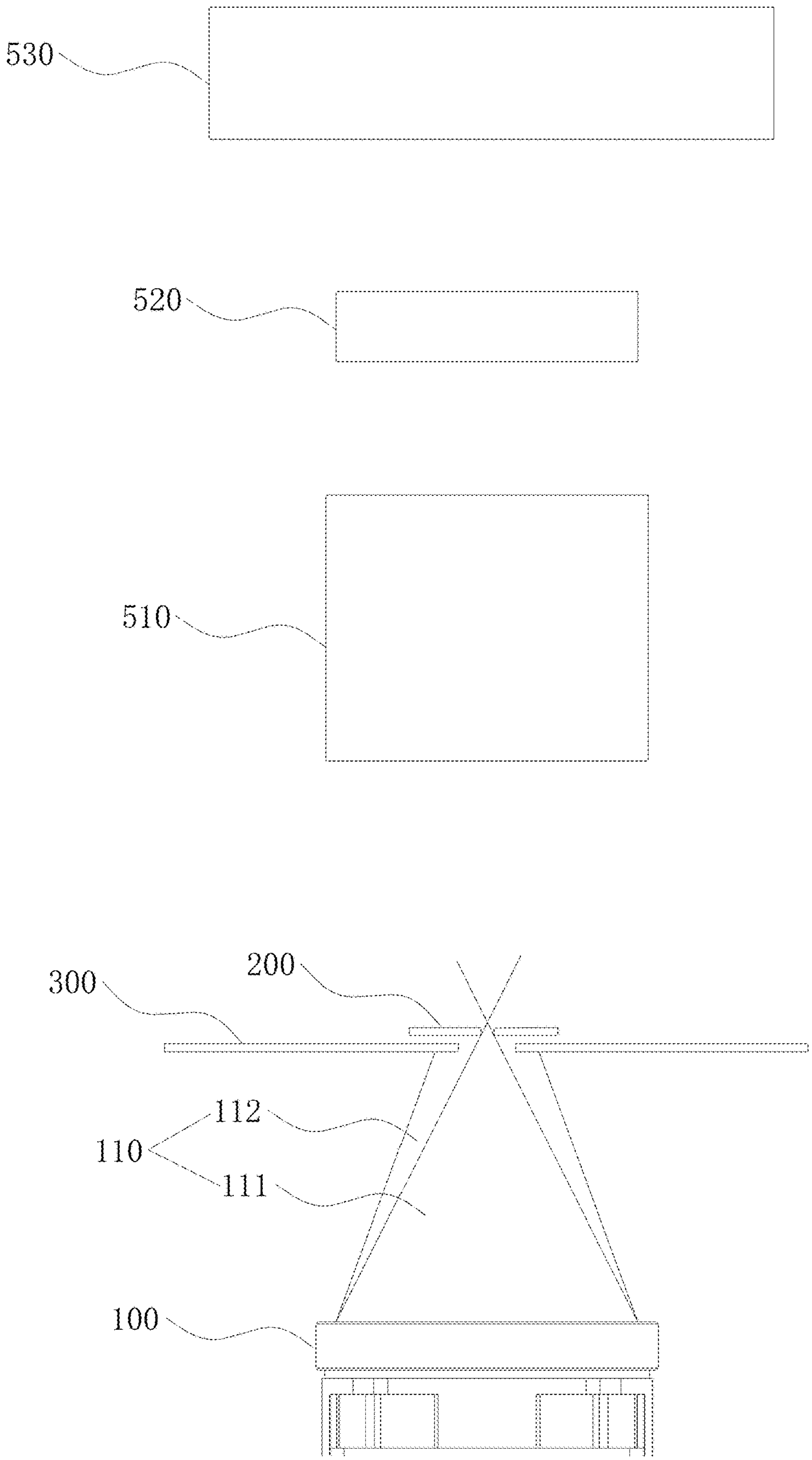
FIG. 1 is a schematic diagram showing an optical path of a light fixture according to the present disclosure.

The drawings are merely for illustrative purposes and should not be interpreted as limitations to this patent. To better illustrate the embodiments, some components in the drawings may be omitted, enlarged, or reduced, and do not represent the actual size of the product. For those skilled in the art, it can be understood that some well-known structures and their descriptions may be omitted in the drawings. The positional relationships depicted in the drawings are for illustrative purposes only and are not to be construed as limiting this patent.

FIG. 1 provides a light fixture according to an embodiment of the present disclosure, including a light source 100 for emitting a source light beam 110, a profile shaping element 200 for interfering with the source light beam 110 to shape the source light beam 110, and at least one light shading blade 300 located between the profile shaping element 200 and the light source 100. The profile shaping element 200 is formed with at least one light transmission portion 260 for effective light rays 111 in the source light beam 110 to pass through. Preferably, at least three light shading blades 300 are arranged circumferentially around the effective light rays 111. A blade driver 310 for the light shading blades 300 and a profile shaping driver 210 for the profile shaping element 200 are independently controlled. When the profile shaping element 200 is in a working state, that is, the profile shaping element 200 is switched into the light path of the light beam for shaping the light beam to project light spots in different shapes, in response to the profile shaping driver 210 changing the area and/or the shape of the light transmission portion 260, the blade driver 310 drives the adjacent light shading blades 300 to cooperatively block the ineffective light rays 112 in the source light beam 110 in a way that the adjacent light shading blades 300 are partially stacked on top of one another, and the light shading blades 300 are always located beyond the effective light rays 111, so as to maintain the temperature of the profile shaping element 200 below a tolerance limit thereof and prevent the profile shaping element 200 from deforming, cracking, or melting. It should be noted that the stacked light shading blades 300 may contact each other, also may not contact each other in the context of the present disclosure.

In the present embodiment, a region of the profile shaping element 200 beyond the light transmission portion 260 is at least partially blocked by the light shading blades 300, which reduces the ineffective light rays 112 irradiating the profile shaping element 200 and thus reduces heat accumulation on the profile shaping element, the temperature of the profile shaping element 200 therefore is always maintained below the tolerance limit thereof. Moreover, with the configuration of at least three light shading blades 300 being arranged circumferentially around the effective light rays 111 passing through the light transmission portion 260 of the profile shaping element 200, and the independently controlled blade drive 310 of the light shading blades 300 and profile shaping driver 210 of the profile shaping element 200, the adjacent light shading blades 300 can be driven to partially stack so as to cooperatively block the ineffective light rays 112, according to the area and/or the shape of the light transmission portion 260 of the profile shaping element 200. The cooperation among the light shading blades 300 allows for greater flexibility in adapting to a change in the light transmission portion 260, so that in a case that the light transmission portion 260 changes in a wide range, heat accumulation on the profile shaping element 200 can still be accurately controlled, and the light shading blades 300 in such configuration are also more compact in structure.

In this embodiment, the effective light rays 111 in the source light beam 110 means light rays of the source light beam 110 that passe freely through the light transmission portion 260 without any obstruction between the light source 100 and the profile shaping element 200, and the ineffective light rays 112 means part of the source light beam 110 other than the effective light rays 111.

It is conceivable that when the profile shaping element 200 is in a non-working state, namely the profile shaping element 200 is switched out of the light path, the entire source light beam 110 can be completely blocked by light shading blade 300 to achieve a light-off effect. In this case, the entire source light beam 110 can be completely blocked by a single light-blocking sheet 300 or by multiple light shading blades.

In a preferred embodiment of the present disclosure, when a change in the area and/or the shape of the light transmission portion 260 results in decrease of the number of the effective light rays 111, the blade driver 310 responds or is activated after a first predetermined time following change of the light transmission portion 260. In such configuration, when the area and/or the shape of the light transmission portion 260 frequently narrows and restores to its original state, the light shading blades 300 remain stationary for a period, which can avoid impact on light effects due to untimely retraction of the light shading blades and accidentally entering the effective light rays 111 caused by slower movement during restoration of the light transmission portion 260.

In this embodiment, the first predetermined time is greater than or equal to 1 s, for example, 3 s, 5 s, 10 s, 15 s, 20 s, 25 s, or 30 s.

In a preferred embodiment of the present disclosure, when a change in the area and/or the shape of the light transmission portion 260 results in increase of the number of the effective light rays 111, the blade driver 310 responds or is activated before the light transmission portion 260 changes. In such configuration, when the profile shaping driver 210 receives an instruction to change the light transmission portion 260 to increase the number of the effective light rays 111, the light shading blades 300 retract in advance to provide space allowing part of the ineffective light rays 112 to become the effective light rays 111.

The light fixture, in particular the controller of the light fixture, analyzes the received instruction and determines the area and/or the shape of the light transmission portion 260 changed by the profile shaping driver 210 according to the instruction. If the number of the effective light rays 111 are to be decreased, or the portion of the effective light rays of the light beam is narrowed, the light shading blades 300 move after a first predetermined time, even if the light transmission portion 260 quickly restores to its original state, the light shading blades 300 will still not affect the effective light rays 111. If the number of the effective light rays 111 is to be increased, namely the portion of the effective light rays of the light beam is widened, the light shading blades 300 move before the light transmission portion 260 changes to reserve space allowing part of the ineffective light rays 112 to become the effective light rays 111.

Figure 5:
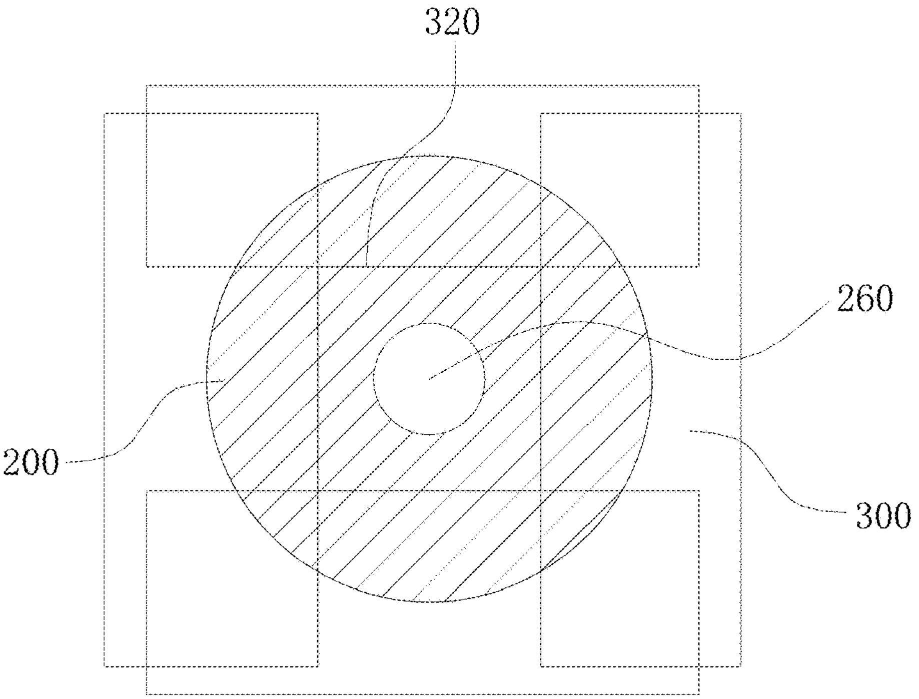
FIG. 5 is a schematic diagram showing projections of a source light beam on the light shading blades and the profile shaping element according to an embodiment of the present disclosure.
Figure 5:
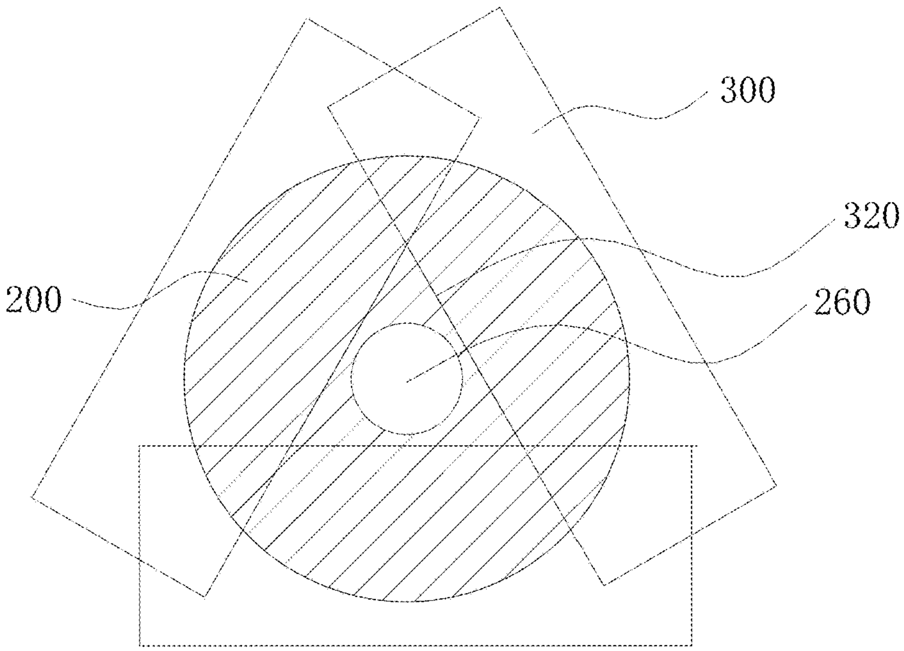

Referring to FIG. 5, in a preferred embodiment of the present disclosure, when the light shading blades 300 cooperatively block the ineffective light rays 112, the light shading blades 300 surrounding the effective light rays 111 form a closed region 320, a region indicated by bold lines as shown, within the source light beam 110, and the profile shaping element 200 is exposed to the source light beam 110 only in the closed region 320. As shown, the closed region 320 may be in a triangle shape (Figure A), or in a rectangle shape (Figure B). That is, the source light beam 110 can only irradiate the profile shaping element 200 through the closed region 320, the periphery of the light transmission portion 260 is blocked by the light shading blades 300, and a projection of the ineffective light rays 112 on the light shading blade 300 can form a continuous annular ring. This reduces a width of a part of the profile shaping element 200 continuously irradiated by the ineffective light rays 112 in a direction perpendicular to the irradiation direction of the source light beam 110, and prevents excessive heat accumulation. In this embodiment, the ineffective light rays 112 are not completely blocked by the light shading blades 300. However, in other embodiments, the ineffective light rays 112 may be completely blocked by the ineffective light rays 112.

In this embodiment, the profile shaping element 200 and the light shading blade 300 jointly intercept the ineffective light rays 112, that is the ineffective light rays 112 are not completely blocked by the light shading blades 300. In such configuration, the profile shaping element 200 is also served to assist in heat dissipation. In addition, this avoids precise driving of the light shading blades 300, and also avoids complex edge design of the light shading blades 300 and allows unique shapes.

In this embodiment, side edges of the light shading blades 300 close to the effective light rays 111 are straight edges.

In a preferred embodiment of the present disclosure, a diameter of a maximum inscribed circle in a projection region of the ineffective light rays 112 on the profile shaping element 200 is less than or equal to 7 mm, that is, the diameter of the maximum circle that can be drawn in the projection region is less than or equal to 7 mm. This reduces the width of the part of the profile shaping element 200 continuously irradiated by the ineffective light rays 112, thereby preventing excessive heat accumulation.

In this embodiment, the diameter of the maximum inscribed circle in the projection region of the ineffective light rays 112 on the profile shaping element 200 is less than or equal to 5 mm.

In a preferred embodiment of the present disclosure, the reflectivity of one side of each light shading blade 300 close to the light source 100 is greater than 70%, so that over 70% of the ineffective light rays 112 irradiated onto the light shading blades 300 can be reflected, which prevents heat accumulation on the light shading blades 300, thereby allowing long-term interception of the ineffective light rays 112.

In this embodiment, the reflectivity of one side of each light shading blade 300 close to the light source 100 is greater than 80%, particularly greater than 90%.

In this embodiment, one side of each light shading blade 300 close to the light source 100 is provided with a high-reflectivity coating layer. The high-reflectivity coating layer may include at least one of barium sulfate, magnesium oxide, or polytetrafluoroethylene, and a base material of the light-blocking sheet 300 is copper.

In a preferred embodiment of the present disclosure, a diffuse reflection structure is formed on a surface of one side of each light shading blade 300 close to the profile shaping element 200. The diffuse reflection structure can reduce stray light rays directed toward the light transmission portion 260, making the effective light rays 111 passing through the light transmission portion 260 purer and resulting in fewer mixed colors in the projected light spot.

Particularly, the diffuse reflection structure may be formed by surface treatment of the light-blocking sheet 300 itself or by coating a plating layer.

Referring back to FIG. 1, the light fixture further includes a focusing lens 510 which is movable along the irradiating direction of the source light beam 110, and the profile shaping element 200 and the light shading blades 300 are both located within a depth of focus of the light beam relative to the focusing lens 510. The light shading blades 300 is also capable of shaping the light beam to form light spots with the profile shape of the light shading blades, by moving the focusing lens 510, it is possible to project light spots shaped by the profile shaping element 200 or the light shading blades 300, thereby achieving various light effects.

In this embodiment, the light fixture further includes a magnifying lens 520 located downstream of the optical path of the focusing lens 510 and movable along the optical path, and a light outlet lens 530 fixedly located downstream of the optical path of the magnifying lens 520.

In a preferred embodiment of the present disclosure, a thickness of each light shading blade 300 is less than 0.5 mm. This ensures clear edge of the projected light spot, especially in a case that the light shading blade 300 is used for imaging.

In this embodiment, the thickness of each light shading blade 300 is less than 0.4 mm, particularly less than 0.3 mm.

Figure 2:
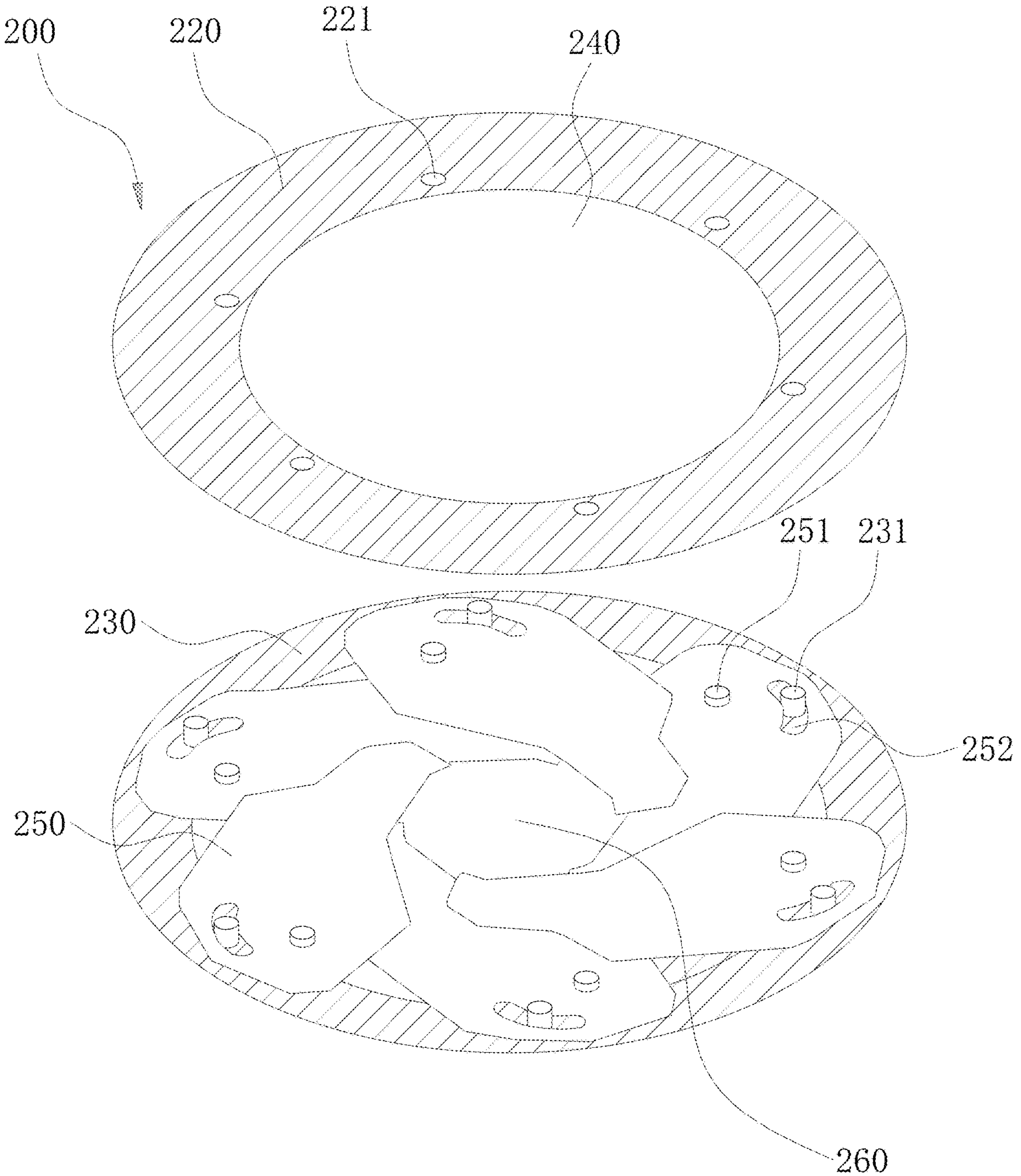
FIG. 2 is a schematic structural diagram of a profile shaping element according to an embodiment of the present disclosure.

Now referring to FIG. 2, in a preferred embodiment of the present disclosure, the profile shaping element 200 particularly includes a plurality of shutter blades 250, and a first mounting plate 220 and a second mounting plate 230 disposed opposite to each other. The first mounting plate 220 and the second mounting plate 230 are correspondingly provided with light-transmitting holes 240, each of the blades 250 has one end pivotally connected to the first mounting plate 220 and the other end slidably connected to the second mounting plate 230, and the plurality of blades 250 are arranged around the light-transmitting holes 240. The light transmission portion 260 in this embodiment is defined by the blades 250, and change in the area and/or the shape of the light transmission portion is performed by rotation of the first mounting plate 220 or the second mounting plate 230 driven by the profile shaping driver 210. This configuration allows all the blades 250 to share one profile shaping driver, which can achieve fast driving speed and high driving efficiency.

In this embodiment, each blade 250 is provided with a pivot post 251 associated with corresponding pivot hole 221 in the first mounting plate 220, and each blade 250 is further provided with a sliding groove 252 associated with corresponding protruding post 231 in the second mounting plate 230.

Figure 3:
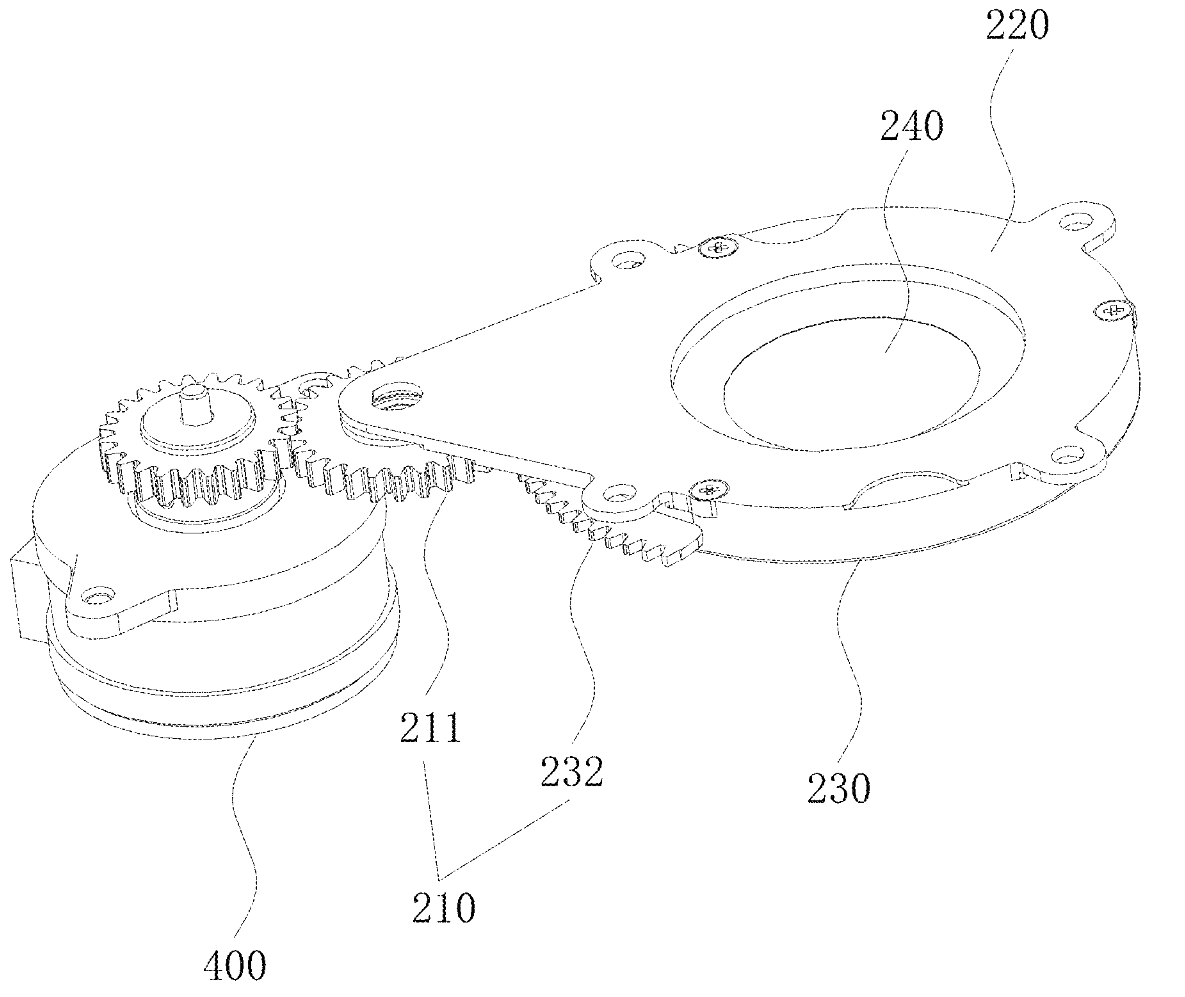
FIG. 3 is a schematic structural diagram of a profile shaping driver according to an embodiment of the present disclosure.

Referring to FIG. 3, the profile shaping driver 210 in this embodiment particularly includes gear teeth 232 disposed on the second mounting plate 230 and a gear set 211 engaged with the gear teeth 232, and the gear set 211 in this embodiment is driven by a motor 400.

In this embodiment, the light transmission portion 260 will be scaled in a circular-like shape, with minimal shape variation.

In other embodiments, the profile shaping element 200 may be a gobo wheel and the light transmission portion 260 may be optional pattern sheets on the gobo wheel. In this case, the area and/or the shape of the light transmission portion 260 may be changed by switching different pattern sheets into the source light beam 110. The light transmission portion 260 may be covered with light-transmitting glass. The profile shaping element 200 may also be a spatial light modulator similar to a digital micromirror device (DMD) chip, which changes the area and/or the shape of the light transmission portion 260 by controlling an angle of a micromirror.

Figure 4:
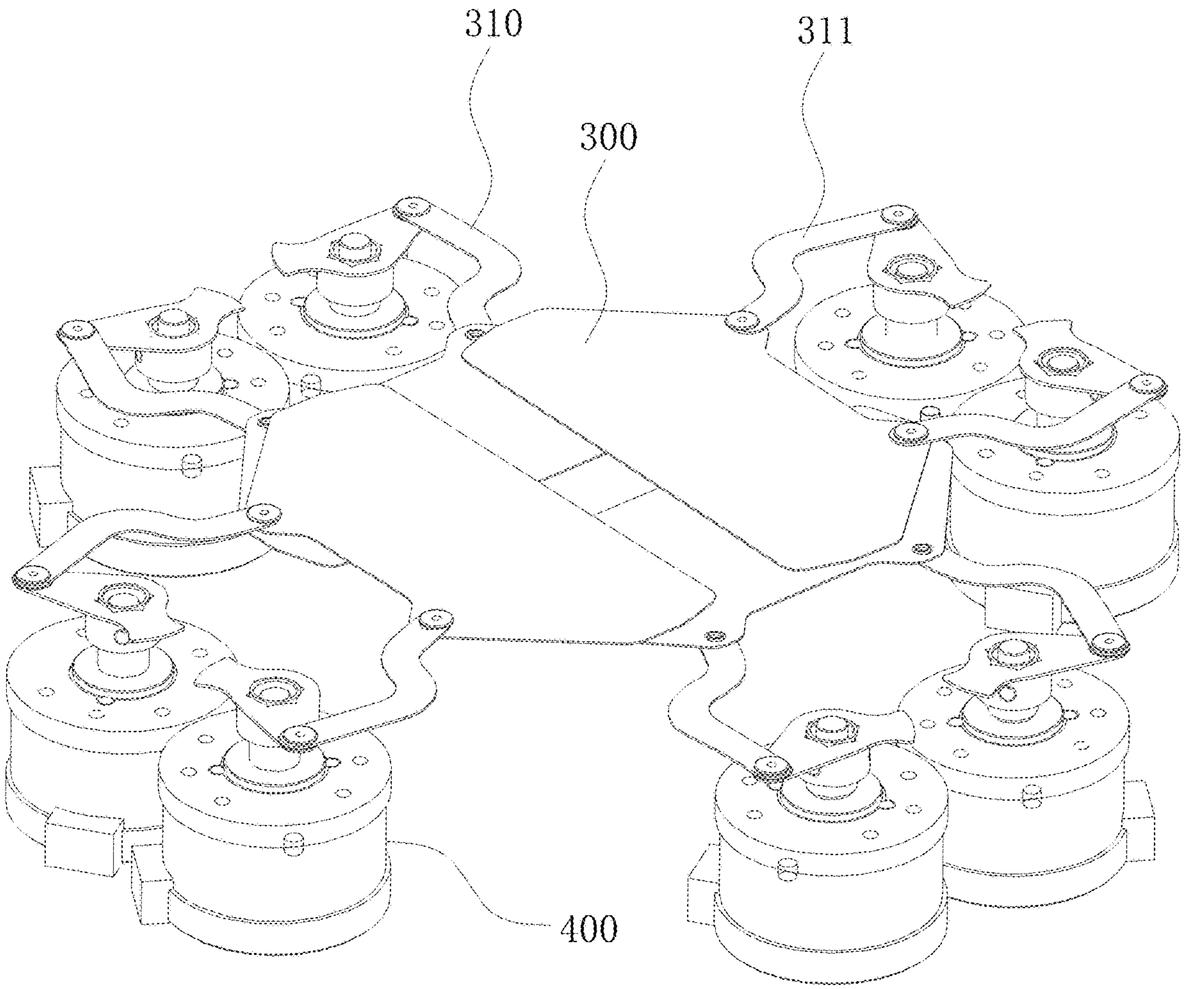
FIG. 4 is a schematic structural diagram of a light shading element according to an embodiment of the present disclosure.

As shown in FIG. 4, in a preferred embodiment of the present disclosure, each of the light shading blades 300 is driven by two independent blade drivers 310 to perform linear movement and/or rotation. Such driving way enables more precise, flexible, and reliable motion control of the light shading blades 300, thereby achieving improved blocking of the ineffective light rays 112.

In this embodiment, each blade driver 310 includes an articulated double-linkage rod 311, with one end fixed to the motor 400 and the other end pivotally or slidably connected to the corresponding light shading blade 300, and two double-linkage rods 311 corresponding to the same light shading blade 300 are respectively connected to two ends of the corresponding light shading blade 300.

In this embodiment, two pairs of light shading blades 300 are provided, the arrangement of the two pairs of light shading blades 300 are respectively along a transverse direction and a longitudinal direction perpendicular to the irradiating direction of the source light beam 110. The four light shading blades 300 block the ineffective light rays 112 from four different directions, which enables precise adaptation to the change in the area and/or the shape of the light transmission portion 260, facilitating temperature control of the profile shaping element 200.

In this embodiment, the light shading blades 300 and the blade drivers 310 may both mounted on a rotatable frame (not shown in the Figures), and the light fixture may further include a rotary driver for driving the rotating frame to rotate.

In a preferred embodiment of the present disclosure, when temperature of any one light shading blade 300 exceeds a predetermined temperature or any one light shading blade remains fixed relative to the ineffective light rays 112 for more than a second predetermined time, the blade drivers 310 drive the light shading blades 300 to move so as to change portions of the light shading blades that intercept the ineffective light rays 112. Such configuration can effectively avoid local heat accumulation on the light shading blades 300, thereby achieving long-term interception of the ineffective light rays 112.

The second predetermined time may be obtained through experiments based on power of the light source 100 and heat resistance of the light shading blades 300.

Apparently, the above embodiments of the present disclosure are only examples provided to clearly illustrate the present disclosure, and are not limitations on the implementations of the present disclosure. For those of ordinary skill in the art, various other forms of modifications or changes can be made on the basis of the above description. It is neither necessary nor possible to enumerate all embodiments herein. Any modifications, equivalent replacements, improvements, etc. made within the spirit and principle of the present disclosure shall be included within the scope of protection of the claims of the present disclosure.

What is claimed is:

1. Alight fixture, comprising:

a light source for emitting a source light beam containing effective light rays and ineffective light rays;

a profile shaping element for shaping the source light beam, which is formed with a light transmission portion for the effective light rays in the source light beam to pass through and provided with a profile shaping driver for changing an area and/or a shape of the light transmission portion; and a light shading element arranged between the profile shaping element and the light source, which comprises at least three light shading blades arranged circumferentially around the effective light rays, and at least one blade driver independently driven relative to the profile shaping driver, wherein the at least one blade driver is configured to drive the at least three light shading blades to cooperatively block at least portion of the ineffective light rays in a way that the adjacent light shading blades are partially stacked on top of one another and keep the at least three light shading blades beyond the effective light rays, in response to the area and/or the shape of the light transmission portion being changed by the profile shaping driver.

2. The light fixture according to claim 1, wherein the at least one blade driver is configured to be activated subsequent to the light transmission portion being changed for a first predetermined time, in response to the change in the area and/or the shape of the light transmission portion resulting in decrease of the number of the effective light rays.

3. The light fixture according to claim 1, wherein the at least one blade driver is configured to be activated prior to the change of the light transmission portion, in response to change in the area and/or the shape of the light transmission portion resulting in increase of the number of the effective light rays.

4. The light fixture according to claim 1, wherein when the ineffective light rays are at least partially blocked by the at least three light shading blades, a closed region is formed within the source light beam by the at least three light shading blades surrounding the effective light rays, and the profile shaping element is exposed to the source light beam only in the closed region.

5. The light fixture according to claim 1, wherein the ineffective light rays are jointly blocked by the profile shaping element and the light shading blades.

6. The light fixture according to claim 5, wherein a diameter of a maximum inscribed circle in a projection region of the ineffective light rays on the profile shaping element is less than or equal to 7 mm.

7. The light fixture according to claim 1, wherein a reflectivity of one side of each light shading blade close to the light source is greater than 70%.

8. The light fixture according to claim 1, wherein a surface of one side of each light shading blade close to the profile shaping element is formed in a diffuse reflection structure.

9. The light fixture according to claim 1, further comprising a focusing lens movable along an emitting direction of the source light beam, wherein the profile shaping element and the light shading blade are both located within a depth of focus of the source light beam relative to the focusing lens.

10. The light fixture according to claim 9, wherein a thickness of each light shading blade is less than 0.5 mm.

11. The light fixture according to claim 1, wherein the profile shaping element comprises:

a first mounting plate and a second mounting plate arranged opposite to each other, the first mounting plate and the second mounting plate are respectively provided with a light-transmitting hole; and a plurality of shutter blades arranged around the light-transmitting hole, each shutter blade having one end pivotally connected to the first mounting plate and the other end slidably connected to the second mounting plate, wherein the light transmission portion is defined by the plurality of shutter blades, and the area and/or the shape of the light transmission portion is changed by the profile shaping driver driving the first mounting plate or the second mounting plate to rotate.

12. The light fixture according to claim 1, wherein a plurality of blade drivers are provided for the at least three light shading blades, which are independently driven relative to each other.

13. The light fixture according to claim 12, wherein each light shading blade is driven by two independently driven blade drivers to perform linear movement and/or rotation.

14. The light fixture according to claim 13, wherein two pairs of light shading blades are provided, an arrangement direction of one pair of the light shading blades being perpendicular to an arrangement direction of the other pair of the light shading blades.

15. The light fixture according to claim 1, wherein when temperature of any one of the at least three light shading blades exceeds a predetermined temperature or any one of the at least three light shading blades remain stationary relative to the ineffective light rays for more than a second predetermined time, the at least three light shading blades are driven by the at least one blade driver to change portions thereof that block the ineffective light rays.

* * * * *